(12) United States Patent
Zucchi

(10) Patent No.: US 9,663,837 B2
(45) Date of Patent: May 30, 2017

(54) DEVICE FOR RECOVERING HEAT AND FUMES FROM SLAG RESULTING FROM THE STEEL PRODUCTION CYCLE

(71) Applicant: G.A.P. S.P.A., Sovere (Bergamo) (IT)

(72) Inventor: Francesco Zucchi, Cremona (IT)

(73) Assignee: G.A.P. S.P.A., Sovere (IT)

( * ) Notice: Subject to any disclaimer, the term of this patent is extended or adjusted under 35 U.S.C. 154(b) by 249 days.

(21) Appl. No.: 14/406,925

(22) PCT Filed: Jun. 3, 2013

(86) PCT No.: PCT/IB2013/054556
§ 371 (c)(1),
(2) Date: Dec. 10, 2014

(87) PCT Pub. No.: WO2013/186664
PCT Pub. Date: Dec. 19, 2013

(65) Prior Publication Data
US 2015/0159232 A1    Jun. 11, 2015

(30) Foreign Application Priority Data

Jun. 15, 2012   (IT) .............................. RM2012A0280

(51) Int. Cl.
| | |
|---|---|
| *C21B 3/00* | (2006.01) |
| *C21B 3/08* | (2006.01) |
| *C21B 7/14* | (2006.01) |
| *F27D 17/00* | (2006.01) |
| *F23J 15/06* | (2006.01) |

(Continued)

(52) U.S. Cl.
CPC ................. *C21B 3/08* (2013.01); *C21B 3/06* (2013.01); *C21B 7/14* (2013.01); *C21C 5/38* (2013.01); *F23J 15/06* (2013.01); *F27D 17/002* (2013.01); *F27D 17/003* (2013.01); *F27D 17/004* (2013.01); *F28D 21/0001* (2013.01); *F28F 3/12* (2013.01); *F28D 9/0062* (2013.01); *F28D 2021/0056* (2013.01); *Y02E 20/363* (2013.01); *Y02P 10/265* (2015.11); *Y02P 10/283* (2015.11); *Y02P 10/34* (2015.11)

(58) Field of Classification Search
CPC ................................. C21B 3/08; F27D 17/003
USPC ........................................................ 266/155
See application file for complete search history.

(56) References Cited

U.S. PATENT DOCUMENTS

| | | |
|---|---|---|
| 379,412 A | 3/1888 | Peck |
| 4,111,159 A | 9/1978 | Okuno et al. |

(Continued)

FOREIGN PATENT DOCUMENTS

| | | |
|---|---|---|
| EP | 0109383 A1 | 5/1984 |
| JP | S54139002 U | 10/1979 |

(Continued)

*Primary Examiner* — Scott Kastler
(74) *Attorney, Agent, or Firm* — Pearne & Gordon LLP

(57) ABSTRACT

Described is a device for recovering heat and fumes from slag resulting from the steel production cycle which allows the heat emitted by the slag during the cooling to be used without the need to collect the slag in tubs which must then be transported to the cooling surface and tipped in order to discharge the slag; at the same time, this device allows the fumes and consequently the heat and the pollutants which the slag emits during the tipping and the time on the cooling surface to be conveyed and treated.

11 Claims, 5 Drawing Sheets

(51) Int. Cl.
  *C21C 5/38*   (2006.01)
  *F28F 3/12*   (2006.01)
  *C21B 3/06*   (2006.01)
  *F28D 9/00*   (2006.01)
  *F28D 21/00*  (2006.01)

(56) References Cited

U.S. PATENT DOCUMENTS

| | | |
|---|---|---|
| 4,175,731 A | 11/1979 | Overdeck et al. |
| 4,572,281 A | 2/1986 | Mullner et al. |
| 2015/0159232 A1* | 6/2015 | Zucchi .................... C21B 3/08 266/155 |

FOREIGN PATENT DOCUMENTS

| | | |
|---|---|---|
| JP | S55132150 U | 10/1980 |
| JP | H05314983 | 11/1993 |

* cited by examiner

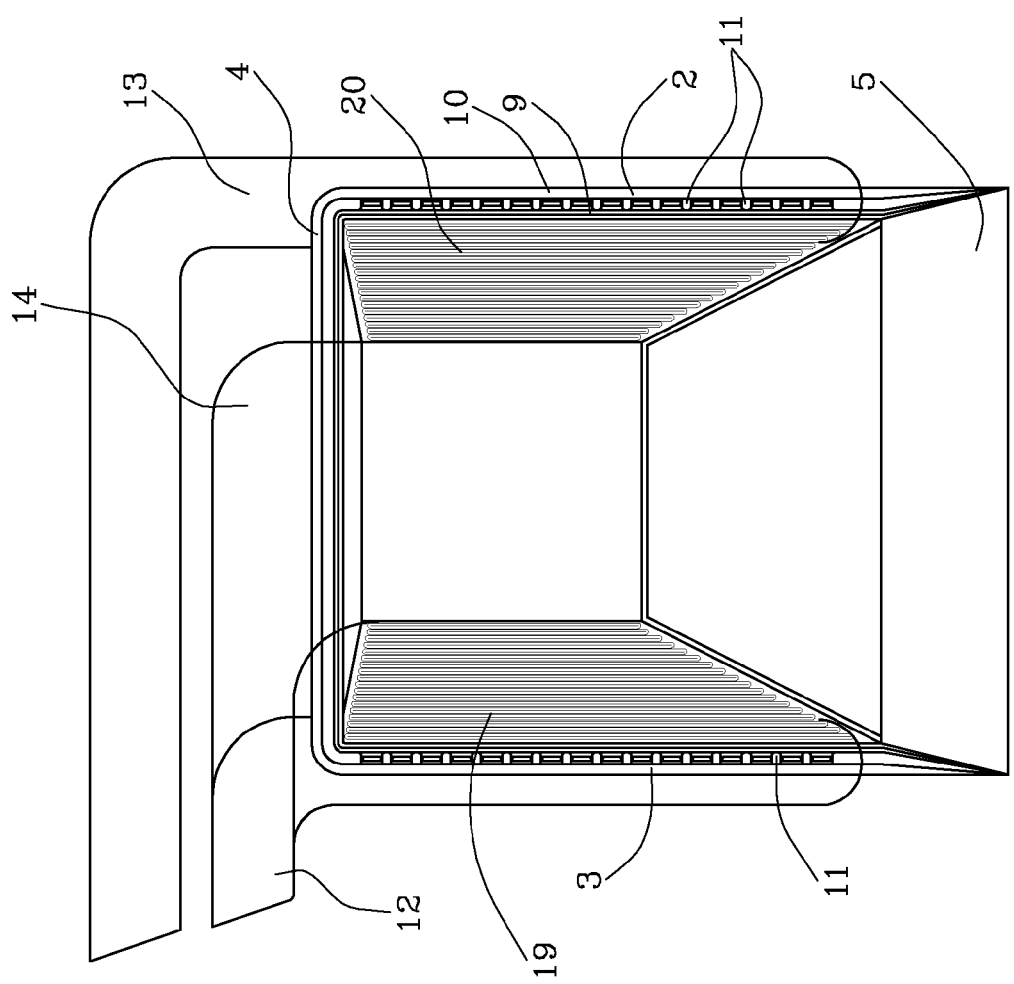

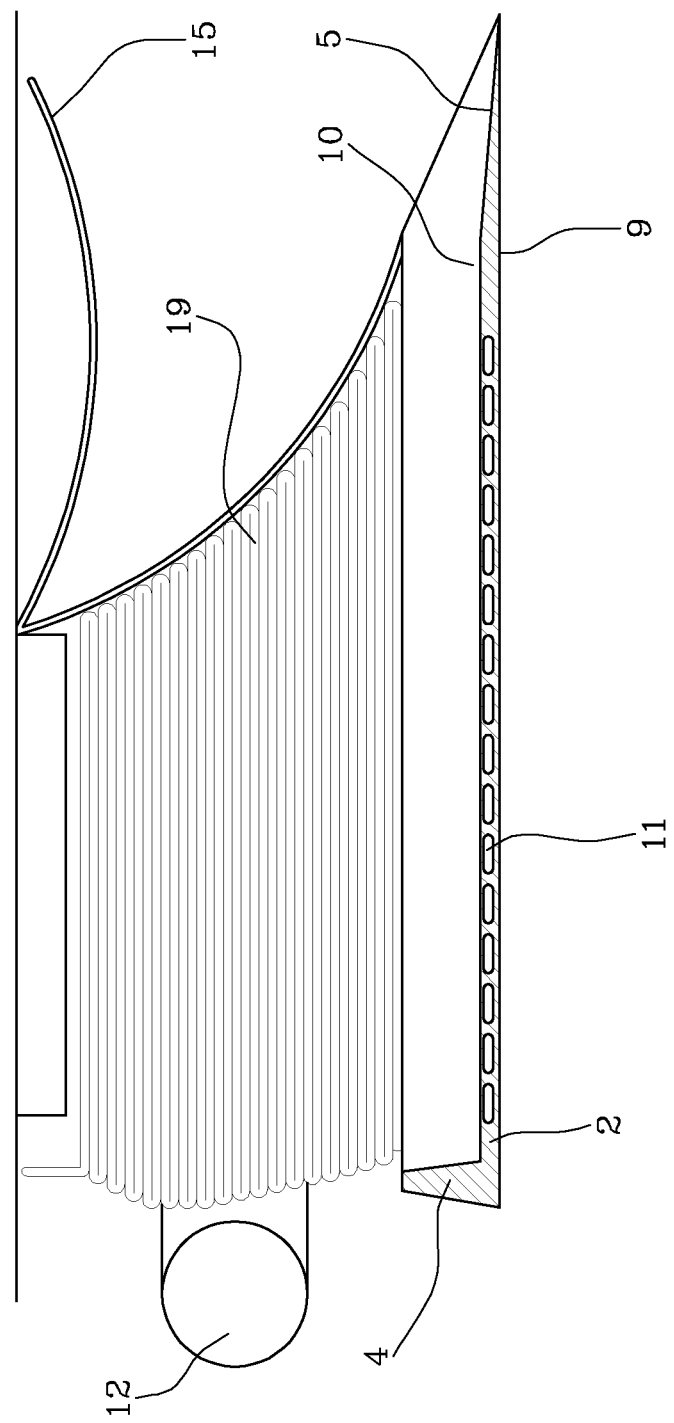

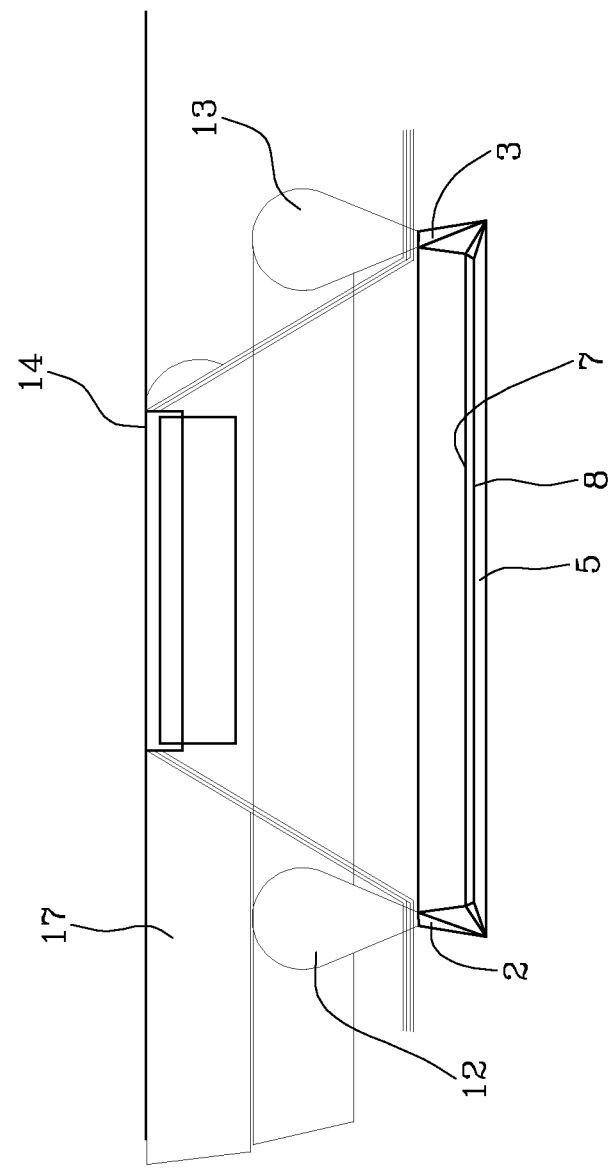

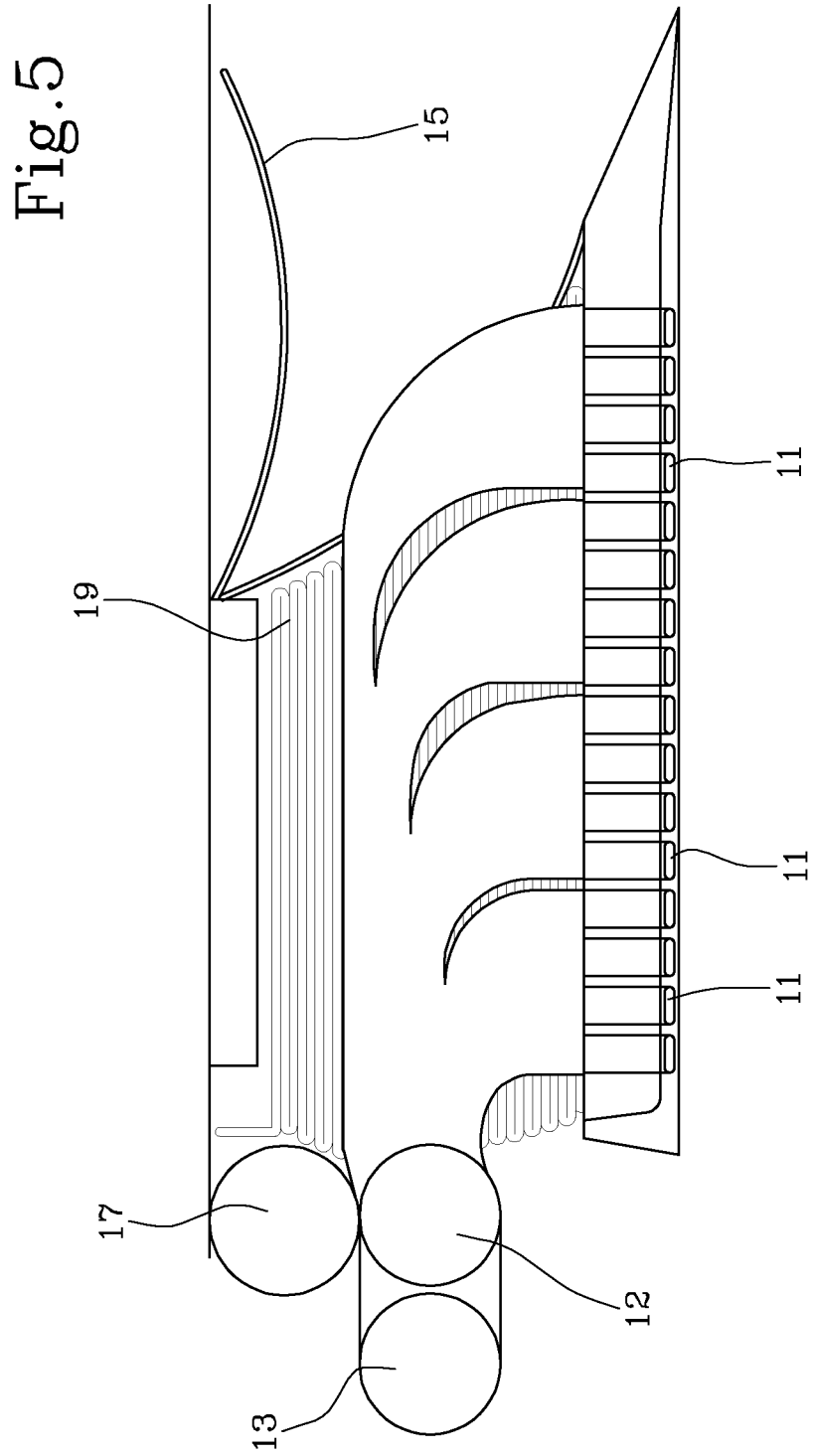

DEVICE FOR RECOVERING HEAT AND FUMES FROM SLAG RESULTING FROM THE STEEL PRODUCTION CYCLE

The steelworks and the iron and steel industries active in the production of steel with electric furnace or integral cycle processes produce large quantities of fluid basic slag during the liquid steel refining phase, due to the addition of the slagging agents introduced previously into the furnace. This slag stratifies on the bath of molten steel due to the effect of the lower specific weight and it is removed by means of the slagging operation, which is performed at the end of the smelting. The slagging phase consists in tilting the furnace from the opposite side to the tapping side favouring the pouring of the slag into a tub.

The tub which collects the slag of the casting is positioned on a trolley or on the ground at the slagging hole. At the end of the casting, the trolley is operated manually by the furnace operators and slides on suitable rails up to the vicinity of the box where the crane operator of the loading crane can pick up the tub and empty it, or, by using the tub tipping trolleys, the tub is picked up from below the furnace, carried and tipped into the cooling box.

The slag remains in the slagging box for various hours, if not days, before being collected and carried to the storage area.

The production of slag tapped from the furnace during every casting is, in percentage, between 12% and 16% of the quantity of liquid steel processed with the casting process: for example, from a furnace with a capacity of 250 t of steel a quantity of slag varying between 30 and 40 tonnes is tapped at every casting.

The slag is tapped and collected in tubs which are usually carried outside the steelworks to outdoor areas for cooling in the open air and in some cases cooling with jets of water. The cooled slag is sent to the storage area and then to the subsequent processing phases.

In the process described the slag contained in the tubs has a temperature of approximately 1,100/1,200° C. Consequently, with the collection and cooling process described a large quantity of energy in the form of heat is dispersed in the air.

It must also be considered that, during cooling, the slag frees non negligible quantities of pollutants, and that various studies performed by experts in the sector have demonstrated that the fast lowering of the temperature of the slag limits the harmful emissions.

Over the years, methods and devices have been developed for recovering heat from the slag from the processing of steel, such as, for example, those described in patents JP 55 132150 U, JP 53 14983 and JP 54 139002 U.

In general, the heat of the slag is recovered in known devices by tipping the slag taken from the furnace and contained in a tub onto a surface which in turn transmits the heat to other devices, such as, for example, pipes in which water or air flows, which is heated and re-used.

The known systems for recovering heat from the slag from the processing of steel have several drawbacks which limit the diffusion and the suitability, such as for example:

the discharge of the high temperature molten slag from the furnace to the cooling box by means of tubs; this operation has a high degree of risk for the operators and considerable costs due to the need to use specially equipped means for the transport and the overturning of the pots.

the difficulty of obtaining a surface of the slag discharged from the tub to the cooling box which is not too thick and is sufficiently uniform with a considerable increase in the cooling times and non-uniform cooling of the slag;

dispersion of a significant quantity of heat of the slag during transfer into the tub, when pouring into the cooling box and in the normal heat exchange process with the air;

impossibility or difficulty of channeling the fumes emitted by the slag during the cooling time with the consequent dispersion into the air of polluting substances.

A first aim of this invention is the recovery, for subsequent use, of the heat emitted by the slag leaving the furnace without the need for collecting the slag in tubs which must then be transported to the cooling surface and overturned there to tip out the slag;

a second aim of this invention is to convey and treat the fumes and consequently the heat and the pollutants which the slag emits during the tipping and the time on the cooling surface;

a third aim of this invention is to provide a system for recovering heat of the slag of a furnace for the production of steel which allows direct discharge of the slag at the slagging temperature directly on the cooling surface of the system; in this way, the heat to recover is at a maximum temperature and the slag is tipped on the cooling surface at the maximum temperature in an almost liquid state and tends to deposit uniformly on the entire surface with a small thickness, guaranteeing a fast cooling and maximum recovery of heat in a very short time.

In accordance with this invention, these aims are achieved by a device formed by:

a slag plane, on which the incandescent slag falls, raised with respect to the ground, comprising a base closed on three sides by walls and joined to the ground by a sloping front element; the base and the walls are preferably made of a sandwich of strong steel sheets comprising two steel sheets placed one in front of the other, made of steel or other similar material, spaced by suitably shaped elements and such as to create, in the space between the two steel sheets, a series of ducts; the space between the two steel sheets and/or the ducts resulting from the spacer elements allow circulation of a fluid such as, for example, air which is heated by the heat of the incandescent slag present on the base;

two insulated air conveyors located above the upper edges of the right and left walls of the slag plane, at the outlets of the ducts present on the sides of the above-mentioned walls between the internal and external steel sheets; one of the ducts is for suction and the other is for delivery, and they collaborate in the circulation of the air or other fluid in the ducts, using the thrust of a centrifugal fan, thus increasing the recovery of heat from the slag;

a suction hood, for example with a truncated pyramid shape, located above the slag plane and adjacent to the right, left and rear walls, equipped with a front door which can be opened and a rear suction window; the top of the hood is equipped with an opening, having a suitable shape for the particular type of furnace, sealed with the ceiling to prevent dispersion of fumes and heat, through which the slag coming from the steel processing cycle is discharged on the base of the slag plane; the outlet of the rear suction window is connected with a suction pipe in which the hot fumes are conveyed to the next processing without dispersion into the atmosphere and allowing a further heat recovery;

one or more water heat exchangers located in the walls of the hood, preferably on the side walls, by means of which the heat emitted by the slag is recovered by irradiation, generating the sudden raising of the temperature of the water and optimising the heat recovery.

The device according to this invention, made of the components described above, is positioned below the furnace of the steel works at the slagging opening in such a way that the slag is poured directly through the opening present in the top of the hood on the base of the slag plane; the slag, at a temperature of approximately 1,500° C. falls on the slag plane and being substantially liquid distributes on the entire plane in a uniform fashion.

The heat emitted by the slag inside the closed hood heats the air which circulates inside the ducts present in the side walls of the slag plane, through the side suction and delivery ducts, and heats the water which circulates in the heat exchangers present in the side walls of the hood. The fumes suction duct prevents dispersion into the atmosphere and allows the treatment and cooling with obvious advantages for reducing the pollution and the heat.

The front wall of the hood which can be opened allows removal of the cooled slag using special means.

The device according to this invention is described below in a non-limiting embodiment by way of an example with reference to the accompanying drawings, in which:

FIG. 2 shows a plan view of the device according to this invention;

FIG. 3 shows a side view, with some parts in cross section, of the device according to this invention;

FIG. 4 shows a front view of the device according to this invention;

FIG. 5 shows a schematic side view of the device according to this invention.

Figure 1:
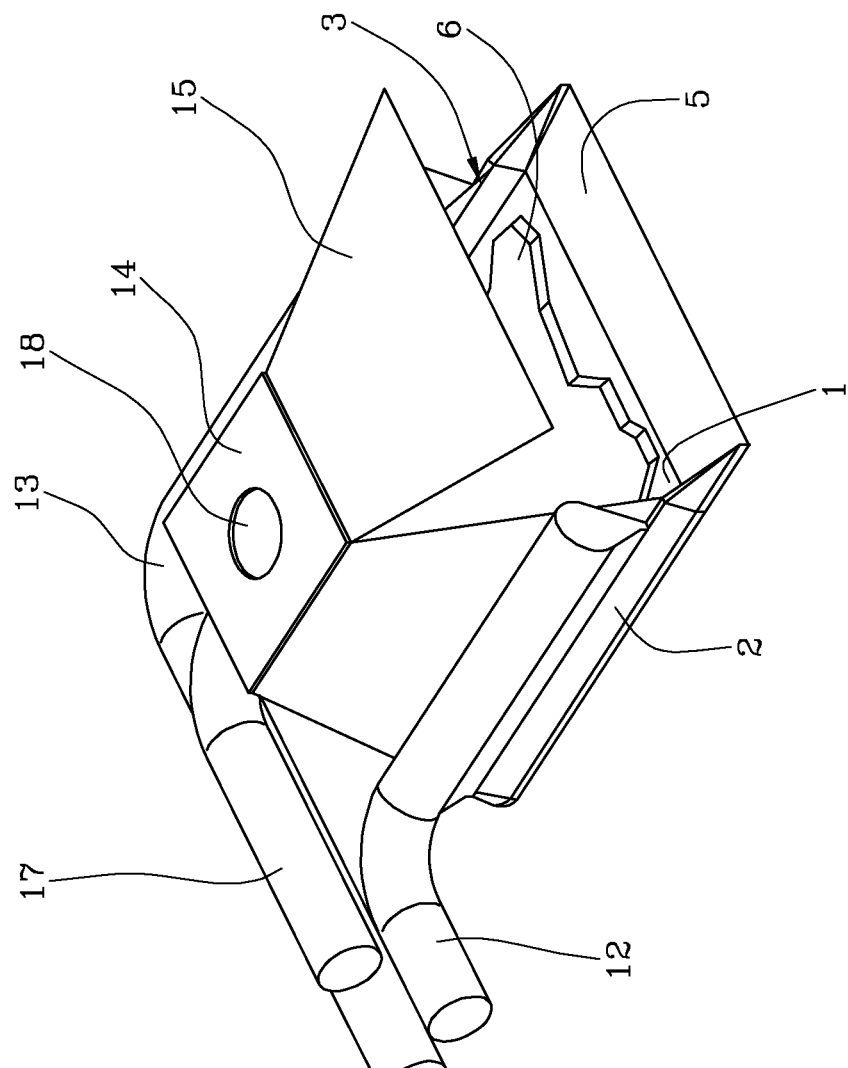
FIG. 1 shows an axonometric view of the device for recovering heat from the slag resulting from the steel production cycle according to this invention.

With reference to the above-mentioned drawings, the device for recovering heat from the slag resulting from the steel production cycle according to a non-limiting embodiment shown by way of an example comprises a slag plane (1) on which the slag (6) is placed directly from the furnace; the slag plane (1) is higher than ground level and is closed on the right and left sides and on the bottom by walls (2, 3, 4), the front side is joined to the ground by an inclined plane (5) which allows mechanical means to remove the cold slag; the slag plane (1) comprises two steel sheet planes (7, 8) positioned one in front of the other kept integral with each other and suitably spaced at approximately 20 cm, using box-shaped elements or beams which create a series of ducts for the passage of the air forced by a turbine (not illustrated); the same construction technique of the slag plane (1) is adopted for the right and left walls (2, 3) which are made with an inner steel sheet (9) and an outer steel sheet (10) kept at a suitable distance of approximately 20 cm by box-shaped elements or beams which create a series of ducts (11) which join with those present in the slag plane (1) and which allow circulation of the air in the slag plane (1) and in the walls (2, 3).

The upper face of the right and left side walls (2 and 3) in which the aeration ducts (11) lead out is joined with conveyors (12 and 13), one for delivery preferably connected to a turbine not shown, and one for suction through which the heated air is conveyed for the successive use.

The steel sheets of the slag plane (1), of the side walls (2, 3, 4) and of the spacer box-shaped elements or beams must have a thickness and a strength such as to bear the weight of the slag which is poured on and of the means which will transit on the slag plane for removing the slag when cooled.

Above the slag plane (1) on the side inside the side walls (2, 3, 4) and inside the outlets of the aeration ducts (11) and of the conveyors (12 and 13) there is a closed circuit suction hood (14), preferably with a truncated pyramid shape, made from lightweight steelwork and insulated externally.

The hood (14) is equipped with an upper opening (18), suitably sealed with the ceiling, through which the slag at a temperature of approximately 1,500° C., therefore in the semi-liquid state, is discharged directly from the furnace onto the slag plane (1).

The hood (14) is equipped with a front door (15) which can be opened to allow the entrance of mechanical means suitable for the removal of the cold slag (6); in the upper part of the rear side, the hood (14) is equipped with a window (16) to which is connected a duct (17) through which the fumes and the heat emitted by the incandescent slag (6) are conveyed for treatment and cooling.

On the inner walls of the hood, preferably on the side walls, there are one or more water heat exchangers (19 and 20) by means of which the heat emitted by the slag (6) is recovered by irradiation, causing the fast raising of the water temperature, thus optimizing the recovery of heat, which can be used later.

As already mentioned, the device for recovering heat from the slag resulting from the steel production cycle is positioned directly below the furnace of the steelworks, in such a way that the slag is discharged directly on the slag plane (1), the hot slag, at approximately 1,500° C., is placed uniformly on the slag plane (1) avoiding the creation of thick layers of slag, which on the contrary occurs with the tipping into the tubs in which the slag has a lower temperature, in which the cooling is not uniform nor fast and the recovery of heat is decidedly poor, rendering it useless.

The heat emitted by the slag (3) inside the closed and insulated hood (14) heats the water which circulates in the heat exchangers (19 and 20), heats the air which circulates in a forced fashion inside the ducts (11) and the fumes suction duct (17) prevents the dispersion of heat and pollutants into the atmosphere.

The front wall (15) of the hood which can be opened automatically allows the discharge of the cooled slag (6) using special means and without any risk for the operators, unlike the current situation, with the movement of the tubs containing the slag at a temperature of approximately 1,000/1,500° C.

The device for recovering heat from the slag resulting from the steel production cycle can be made to the size suitable for the furnace which must use it and an average size can be approximately 12.5 m in length by 10.5 m in width.

The invention claimed is:

1. A device for recovering heat and fumes from process slag, characterised in that the device can be associated with a processing/production system from which it receives incandescent slag, the device comprising:
   a slag plane (1) on which the incandescent slag falls, delimited by side walls, the slag plane (1) and the side walls comprising steel sheets (9 and 10), the steel sheets being positioned one in front of the other and spaced from each other by spacer elements which are able to create between the steel sheets (9 and 10) a plurality of ducts (11) through which air circulates;
   a plurality of insulated conveyors (12 and 13) for conveying air, associated with at least one side wall at an outlet of the ducts (11), at least one of the conveyors introducing air into the ducts (11) and at least one conveyor sucking air from the ducts (11), the conveyors allowing the circulation of air in the ducts (11) which heats due to the heat emitted by the incandescent slag (6) present on the slag plane (1) and a suction hood (14) located above the slag plane (1), the hood (14) having a front door (15) which can be opened, a rear suction window (16) connected with a suction duct (17) and an upper opening (18) through which the incandescent slag (6) is discharged onto the slag plane (1).

2. The device according to claim 1, characterised in that it comprises a predetermined number of water heat exchangers (19, 20) located on internal walls of the hood (14) for the recovery by irradiation of the heat emitted by the incandescent slag (6).

3. The device according to claim 2, characterised in that the heat exchangers (19, 20) are located on internal side walls of the hood.

4. The device according to claim 1, characterised in that it also comprises means for thermal treatment of fumes produced by the incandescent slag (6) and sucked through the suction window (16), from the suction duct (17).

5. The device according to claim 1, characterised in that it also comprises means for treatment and suppression of pollutant components contained in the fumes produced by the incandescent slag (6).

6. The device according to claim 1, characterised in that the spacer elements are box-shaped elements.

7. The device according to claim 1, characterised in that the spacer elements are beams.

8. The device according to claim 1, characterised in that the spacer elements are tubular elements.

9. The device according to claim 1, characterised in that walls of the hood (14) are insulated.

10. The device according to claim 1, characterised in that the hood (14) is made of lightweight steelwork.

11. The device according to claim 1, wherein the device also comprises means for cooling of fumes produced by the incandescent slag (6) and sucked through the suction window (16), from the suction duct (17).

* * * * *